United States Patent
Karumuri et al.

(10) Patent No.: US 10,472,003 B2
(45) Date of Patent: Nov. 12, 2019

(54) INTEGRATED EXTENDED BED ASSEMBLY FOR VEHICLE

(71) Applicants: Hyundai America Technical Center, Inc, Superior Township, MI (US); Hyundai Motor Company, Seoul (KR); Kia Motors Corporation, Seoul (KR)

(72) Inventors: Santhosh Karumuri, Farmington Hills, MI (US); Jonathan Green, Belleville, MI (US); Adrien Wang, Ann Arbor, MI (US); Shawn Slovesko, Santa Clara, CA (US)

(73) Assignees: Hyundai America Technical Center, Inc., Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 154 days.

(21) Appl. No.: 15/354,462

(22) Filed: Nov. 17, 2016

(65) Prior Publication Data

US 2018/0134205 A1    May 17, 2018

(51) Int. Cl.
*B62D 33/027*    (2006.01)
*B60P 3/40*    (2006.01)
*B62D 33/03*    (2006.01)

(52) U.S. Cl.
CPC ............. *B62D 33/027* (2013.01); *B60P 3/40* (2013.01); *B62D 33/0273* (2013.01); *B62D 33/03* (2013.01)

(58) Field of Classification Search
CPC .. B62D 21/14; B62D 33/027; B62D 33/0273; B62D 33/03; B60P 3/40
USPC .... 296/26.08, 26.09, 26.1, 26.11, 37.6, 57.1, 296/175
See application file for complete search history.

(56) References Cited

U.S. PATENT DOCUMENTS

| | | | |
|---|---|---|---|
| 4,531,773 A | 7/1985 | Smith | |
| 5,669,654 A | 9/1997 | Eilers et al. | |
| 5,816,637 A | 10/1998 | Adams et al. | |
| 5,924,753 A | 7/1999 | DiBassie | |
| 5,975,608 A | 11/1999 | Jarman | |
| 6,019,410 A | 2/2000 | Trostle et al. | |
| 6,120,076 A | 9/2000 | Adsit et al. | |
| 6,293,602 B1 | 9/2001 | Presley | |
| 7,055,879 B2 | 6/2006 | De Gaillard | |
| 7,828,356 B2 * | 11/2010 | Wood | B62D 33/027 296/26.08 |
| 8,109,552 B2 | 2/2012 | Nelson | |
| 2001/0005085 A1 * | 6/2001 | Bauer | B60P 1/435 296/57.1 |

(Continued)

FOREIGN PATENT DOCUMENTS

CN    101500846 B    7/2013

*Primary Examiner* — Stephen T Gordon
(74) *Attorney, Agent, or Firm* — Mintz Levin Cohn Ferris Glovsky and Popeo, P.C.; Peter F. Corless

(57) ABSTRACT

An integrated extend bed assembly for a vehicle is provided. The extended bed assembly includes a bed assembly that is mounted at a rear of the vehicle and a bed extension that is slidably fitted into the bed assembly. The bed extension is extendable rearward of the bed assembly in a linear motion. Additionally, sliding members are mounted to the bed assembly and the bed extension to support the bed extension in an extended position.

4 Claims, 10 Drawing Sheets

(56) References Cited

U.S. PATENT DOCUMENTS

2002/0023938 A1* 2/2002 Kmita ................. B60P 3/40
                                                    296/37.6
2003/0141733 A1   7/2003 Burg

* cited by examiner

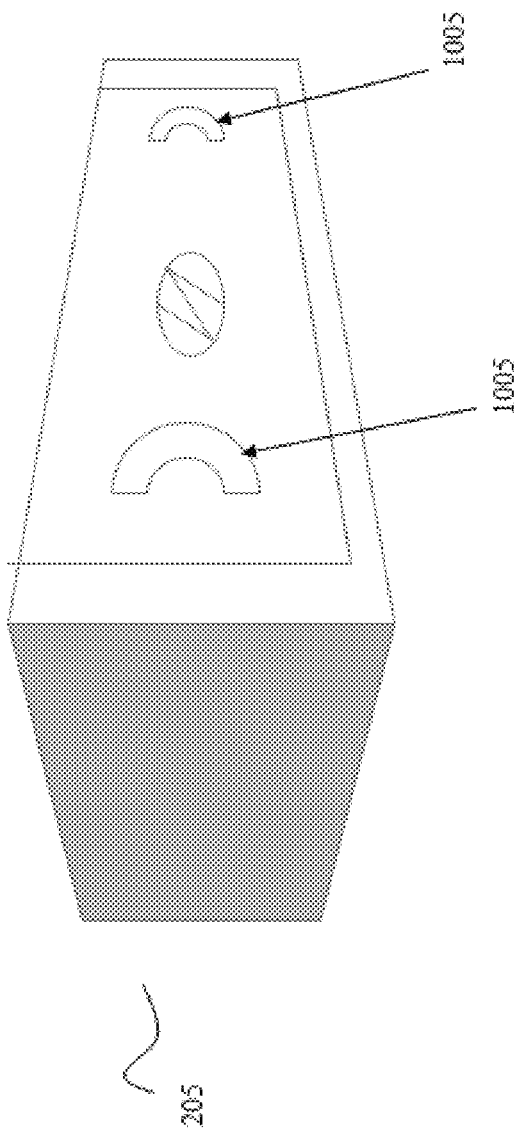

INTEGRATED EXTENDED BED ASSEMBLY FOR VEHICLE

BACKGROUND

1. Field of the Disclosure

The present disclosure relates to an integrated extended bed assembly for a vehicle, and more particularly, to an integrated extended bed assembly for a vehicle that is slidably fitted into a vehicle bed assembly and extended rearward by a manual manipulation.

2. Description of the Related Art

Generally, various vehicle types, such as trucks, are mounted with a larger storage area (e.g., a truck bed) capable of storing a substantial amount of cargo. The bed typically includes a gate, or a tailgate, that restrains the cargo within the bed during vehicle operation. The bed is also typically open with an optional installation of a top cover. However, when the cargo to be transported that is too large to fit within the limited space of the truck bed, the gate is typically left open or the cargo hangs over the edge of the truck bed, thus requiring manual securement. Such cargo transportation creates an unsafe driving environment since the cargo is susceptible to falling out of the truck bed and creates potential harm to surrounding vehicles during vehicle operation.

Recently, various techniques have been developed to increase the space limitations of conventional truck beds. These developed techniques of the related art provide removable systems that attach onto a truck bed. According to one developed technique, a truck bed is extended by opening the gate and attaching a fence structure to the outer edges of the open gate. The fence structure is then secured to the ends of the truck bed and the outer edge of the gate. In other words, the inner surface of the gate is the maximum extended length of the truck bed. Alternately, the extension may consist of three panels removably attached to the open gate. This design requires a separate structure to be stored when not in use and also requires separate installment of the extension to elongate the truck bed. The fence or extension both require substantial space within the truck bed during storage. The gate itself is also the only provided support for the extension or fence and thus, the extension is not capable of extending beyond the gate. Therefore, the technique is limited in the allowed extension of the truck bed since the inner surface of the gate is the only support for the fence or extension.

According to a similar technique, an extension may be a panel hinged to the tailgate and connected to the truck bed by extended strut braces. However, no additional support is provided for this extension and the design is thus limited in load capacity. Additionally, since this extension requires the gate to be in an open position, the vehicle does not include any enclosure to secure the cargo in the truck bed when the extension is in use. According to another design, a second cargo floor is slidably mounted on top of the existing truck bed flooring. Particularly, the second cargo floor slides out rearward from the truck bed when the gate is open. However, such a technique does not provide an integrated type of extension and the second cargo floor decreases the current available space of the truck bed. The structural configuration is also complex, requiring installment of large components onto the truck bed.

Furthermore, another technique provides a complex structure in which an extension of the truck bed or a second cargo bed is slidably fitted under the truck bed. Accordingly, the extension is capable of being stowed during nonuse without occupying the existing truck bed space. However, to extend the second cargo bed, multiple sliding elements are required to be moved by an actuator which drives a pinion gear to drive a rack gear in mechanical communication with the second cargo bed. Additionally, the second cargo bed is only capable of being stopped in two positions, either in a fully extended position or a fully stowed position. In other words, this technique requires many complex elements to interwork together in order for the second cargo bed to move aft of the truck bed. The design is also only configurable in two positions, stowed or fully extended.

It is therefore desirable to provide a simplified and integrated extended bed assembly for a vehicle that is capable of increasing cargo space during use and capable of being stored during nonuse without occupying existing bed space.

The above information disclosed in this section is merely for enhancement of understanding of the background of the disclosure and therefore it may contain information that does not form the prior art that is already known in this country to a person of ordinary skill in the art.

SUMMARY

The present disclosure provides an integrated extended bed assembly for a vehicle that is slidably fitted into a vehicle bed assembly and extended rearward by a manual manipulation.

According to one aspect of the present disclosure, an integrated extended bed assembly is provided for a vehicle which provides increased cargo storage using a simplified extension method. The extended bed assembly may include a bed assembly that is mounted at a rear of the vehicle and a bed extension that is slidably fitted into a frame of the bed assembly. The bed assembly is extendable rearward of the bed assembly in a linear motion. Additionally, the extended bed assembly may include sliding members that are mounted to the bed assembly and the bed extension to support the bed extension in an extended position. The sliding members may include at least one guide that is secured to a bottom of the bed assembly and at least one support member inserted into the guide and configured to slide rearward beyond the bed assembly to support the bed extension in the extended position. Particularly, a distal end of the support member may be coupled to a bottom of the bed extension to move rearward with the sliding movement of the bed extension.

In an additional aspect, the support member may be fixed in various positions along the guide to fix a position of the bed extension. The support member may be released from and fixed to the guide by actuation of a release handle. Particularly, the release handle may be spring loaded and the position of the bed extension may be fixed when a protrusion on the release handle is fitted into one of multiple apertures formed in the support member aligned with the aperture formed in the guide. The release handle may be coupled to a bottom of the bed assembly by a securing mechanism. One end of the release handle is pushed upwards toward the bed assembly to release the protrusion from the apertures and allow the bed extension to slide rearward in a linear motion.

In another aspect, the support member may be released from the guide by actuation of handles that are mounted on a back side or a rear side of the gate. One or both of the handles may include a release lever to unlock the sliding members from a fixed position. Generally, the support member may be released from the guide by an integrated lock for two or more extension positions of the bed extension. The bed extension may be slidably fitted between a top and the bottom of the bed assembly frame to thus be integrated with the bed assembly. Further, the bed extension may be extended in three variable positions rearward from the bed assembly.

In a further aspect, a gate may be attached at an end of the bed extension and the gate may be opened and closed. In particular, the gate may be hinge-coupled to the end of the bed extension. When the gate is in an open position, a fence may further be coupled to the end of the bed extension and supported by the open gate to further extend the bed assembly.

In yet another aspect, a method of operating an integrated extended bed assembly is provided that may include actuating a lever attached to a bed assembly of a vehicle with one end releasably coupled to sliding members that are mounted to the bed assembly and a bed extension. The method may further include sliding the bed extension rearward of the bed assembly in response to the actuation of the lever. The actuation of the lever releases the lever from the sliding members. Additionally, the method may include opening a gate attached at an end of the bed extension and coupling a fence at the end of the bed extension and supported by the open gate.

Notably, the present disclosure is not limited to the combination of the latch assembly elements as listed above and may be assembled in any combination of elements as described herein.

Other aspects of the disclosure are disclosed infra.

BRIEF DESCRIPTION OF THE DRAWINGS

The above and other objects, features and advantages of the present disclosure will be more apparent from the following detailed description taken in conjunction with the accompanying drawings, in which:

FIG. 10 is a view of release handles of the extended bed assembly according to another exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure provides an integrated extended bed assembly that provides a vehicle with increased storage space. According to the present disclosure, the extended bed assembly is formed to be integrated with a bed assembly of a vehicle by being fitted there into. Thus, the extended bed assembly does not use existing space of the bed assembly. Additionally, the extended bed assembly is a simplified structural configuration that is actuated manually by an integrated lock for ease of use. An operator is capable of easily sliding the extended bed assembly out from the stored position within the vehicle bed assembly by manually releasing a lever. The extended bed assembly is then capable of being fixed in multiple different positions to accommodate different cargo loads and is strong enough to hold the same load as the vehicle bed. Thus, the present disclosure provides an improved bed assembly in which the cargo area of a vehicle may be extended using a simplified structure integrated with the structure of the vehicle bed. The integrated extended bed assembly of the present disclosure will be described herein below in further detail.

Figure 1:
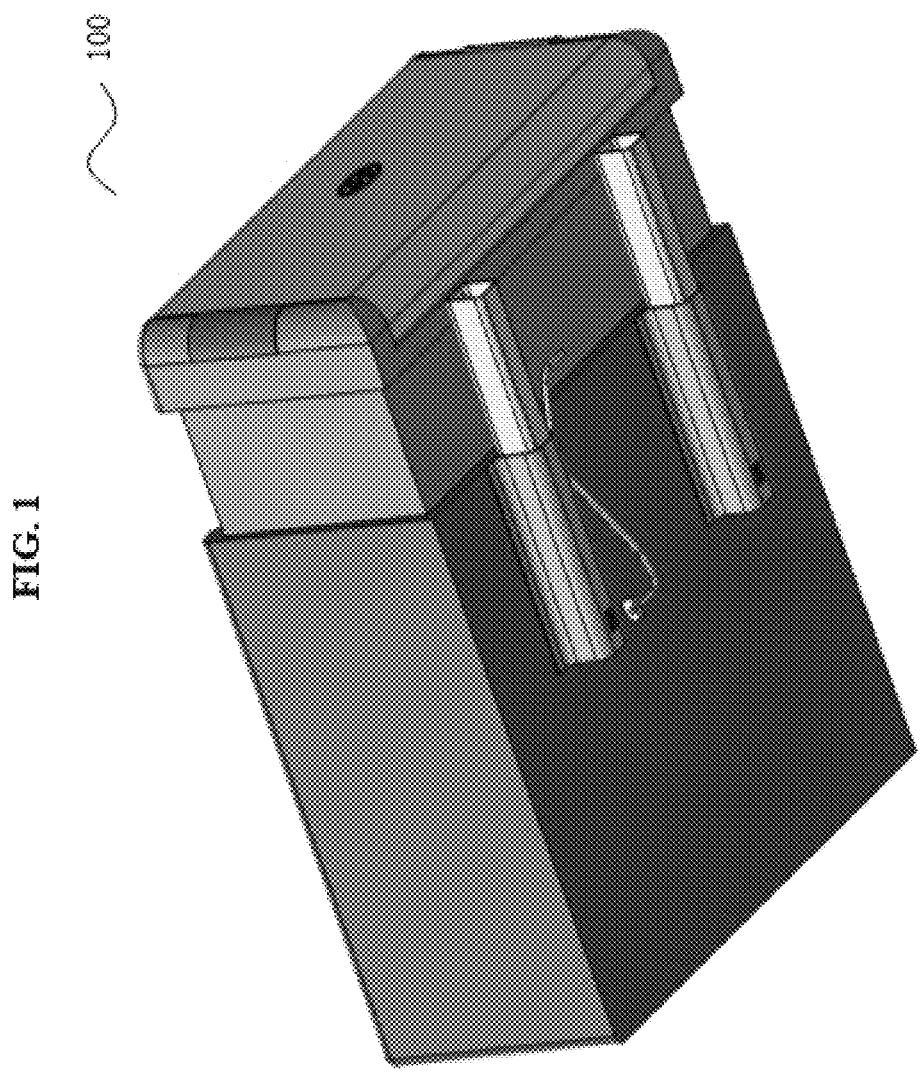
FIG. 1 is a perspective view of an extended bed assembly for a vehicle according to an exemplary embodiment of the present disclosure.
Figure 2:
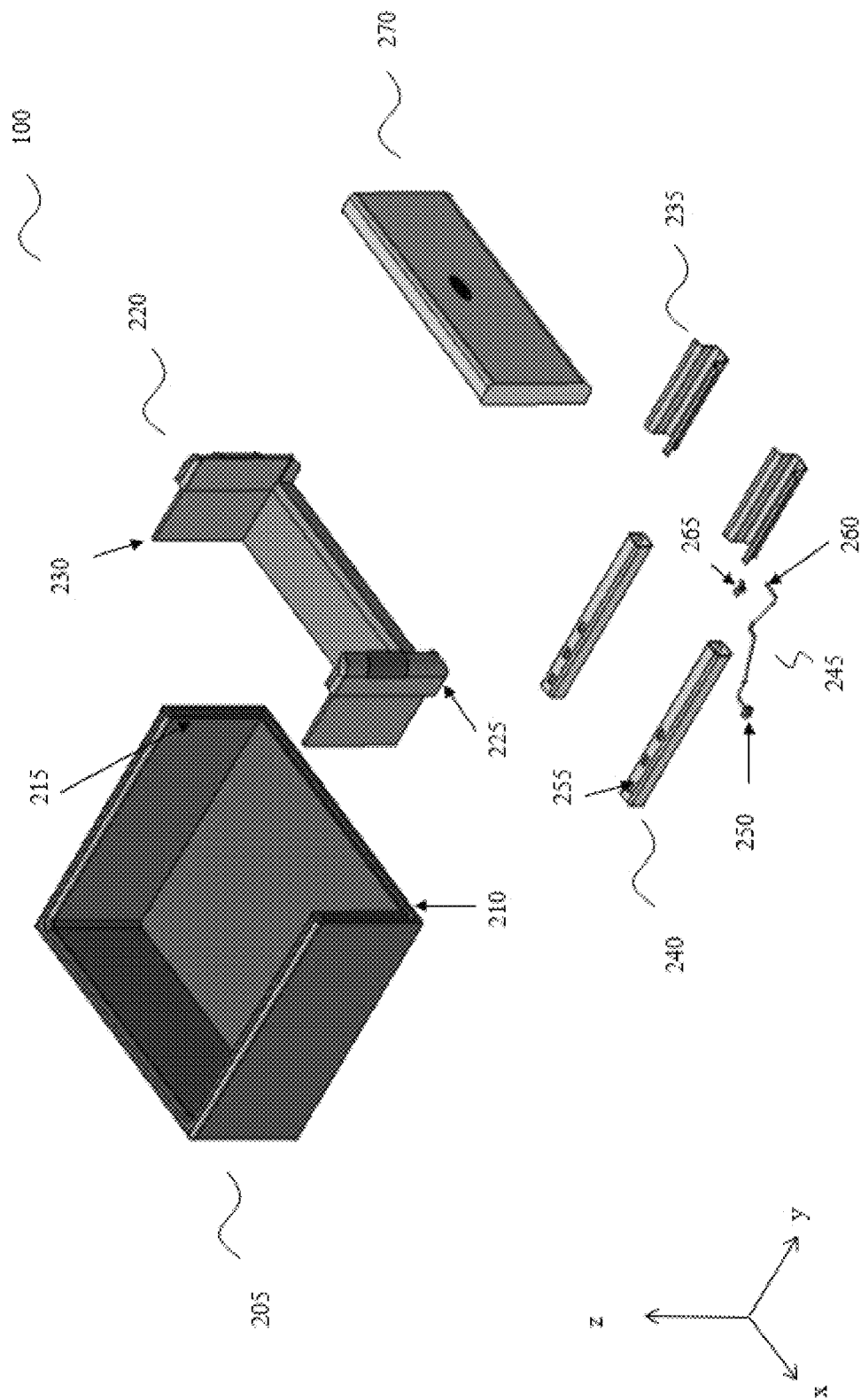
FIG. 2 is an exploded view of the extended bed assembly for a vehicle according to an exemplary embodiment of the present disclosure.

In particular, according to one aspect, the present disclosure provides, as shown in FIG. 1, an integrated extended bed assembly 100 for a vehicle that is slidably fitted into a vehicle bed assembly and extended rearward by a manual manipulation. Referring to FIG. 2, the extended bed assembly 100 may include a bed assembly 205 that is mounted at a rear of the vehicle and a bed extension 220 fitted into the bed assembly 205. The bed extension 220 is extendable rearward of the bed assembly 205 in a linear motion as shown by arrow 'y' in FIG. 2. Additionally, the extended bed assembly 100 may include sliding members (235, 240) mounted to the bed assembly 205 and the bed extension 220 to support the bed extension 220 in an extended position.

The sliding members (235, 240) may include at least one guide 235 secured to a bottom of the bed assembly 205 and at least one support member 240 inserted into the guide 235. The exemplary embodiment of the present disclosure shows two guides 235 and two support members 240, but the present disclosure is not limited thereto and a fewer number or a greater number of sliding members may be used. Further, the support member 240 may be configured to slide rearward beyond the bed assembly 205 to support the bed extension 220 in an extended position. Particularly, a distal end of the support member 240 may be coupled to a bottom of the bed extension 220 to move rearward with the sliding movement of the bed extension 220. The bed extension is capable of extending the entire cargo area by at least 2 feet with additional length provided when the gate of the bed assembly is opened. The present invention, however, is not limited thereto, and the bed extension is capable of further extending the cargo area of a vehicle.

Figure 3:
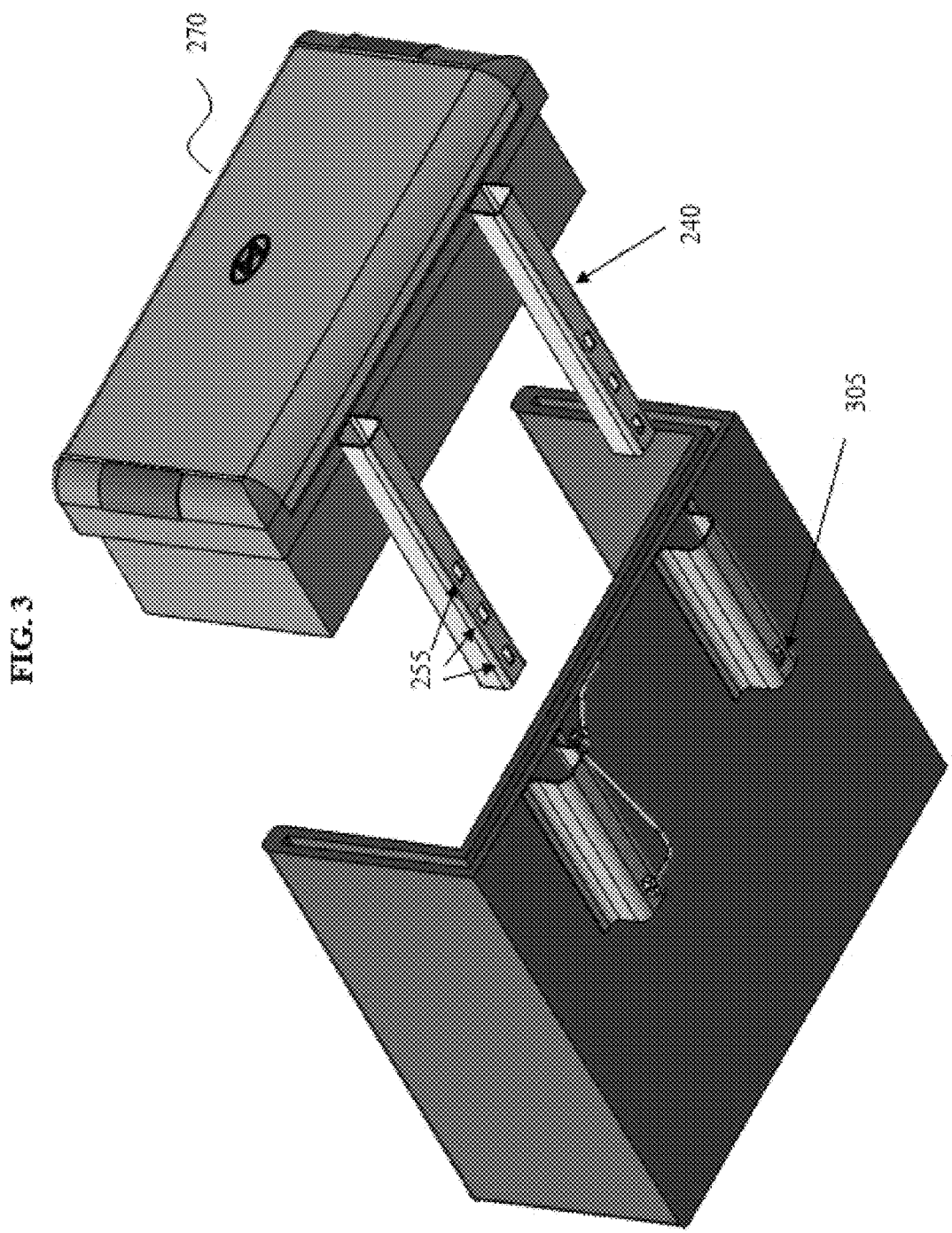
FIG. 3 is a view of the attachment of the extended bed assembly to a vehicle according to an exemplary embodiment of the present disclosure.

FIG. 3 illustrates the attachment of the bed extension 220 to the bed assembly 205. First, as shown in FIG. 3, the guides 235 are mounted to a bottom surface of the bed assembly 205 and a distal end of the support members 240 are coupled to a bottom of the bed extension. Accordingly, the support members 240 both support the bed extension 220 and control the movement of the bed extension 220. The support members 240 may each include multiple apertures 255 formed therethrough. The exemplary embodiment illustrates three apertures, but the present disclosure is not limited thereto and the support members 240 may include a different number of apertures. Additionally, the guides 235 may include one aperture 305 formed therethrough. The apertures may be used to fix or lock the position of the bed extension 220 which will be described herein below.

Further, when the support members 240 are slid or inserted into the guides 235, a portion 230 of each side of the bed extension 220 (e.g., the two side panels 230 of the bed extension 220) slide into the bed assembly 205 between a top 215 and a bottom 210 of a frame of the bed assembly 205, thus being fitted into the bed assembly 205 upon insertion. A protrusion 225 or flange of the bed extension 220 abuts the end of the bed assembly 205. In other words, the protrusion 225 operates as a stopper to prevent the bed extension 220 from further sliding into the bed assembly frame (210, 215). FIG. 3 also shows a gate 270 attached at an end of the bed extension 220. The gate 270 is configured to open and close and may be hinge-connected to the bed extension 220 to thus enclose cargo in the bed assembly.

Figure 4:
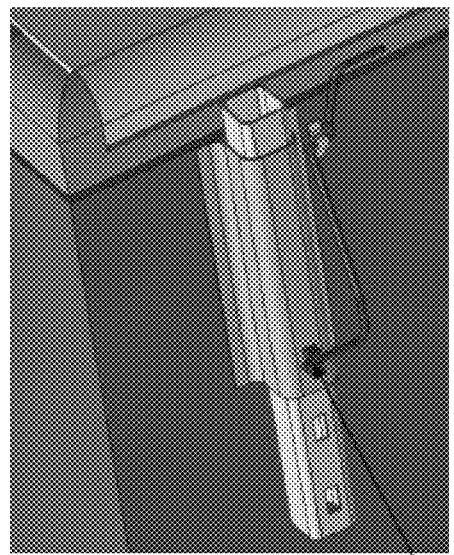
FIG. 4 is a detailed view of the sliding members of the extended bed assembly according to an exemplary embodiment of the present disclosure.

Once the support members 240 are inserted into the guides 235, the bed extension 220 may be fixed in various positions. At least one support member 240 may be fixed in various positions along the guides 235 to thus fix the position of the bed extension 220. In particular, the position of the support member 240 and the bed extension 220 may be fixed using a release handle 245 attached to a bottom of the bed assembly 205. The release handle 245 may be attached to the bed assembly 205 by a mounting attachment 265 or any other fastening mechanism. In particular, a protrusion 250 formed at one end of the release handle 245 may be fitted into one of the multiple apertures 255 formed in the support member 240 aligned with the aperture 305 formed in the guide 235. FIG. 4 illustrates an engaged position 405 of the protrusion 250 into the apertures 255, 305 to fix the support member 240, which in turn fixes the position of the bed extension 220. In an alternate exemplary embodiment, the bed extension 220 may be released from a fixed position by actuation of handles 1005 shown in FIG. 10. The handles 1005 may be mounted on a back side of a gate 270 attached at the end of the bed extension 220 to enclose the storage space of the vehicle. For example, at least one of the handles 1005 may operate as an integrated lock for two or more extension positions of the bed extension 220. According to yet another exemplary embodiment, extended bed assembly may include various drive elements to slidably move the bed extension rearward of the bed assembly. For example, the drive elements may include a rack and pinion gear set and a motor to thus move the bed extension rearward by a motorized motion.

Figure 5A:
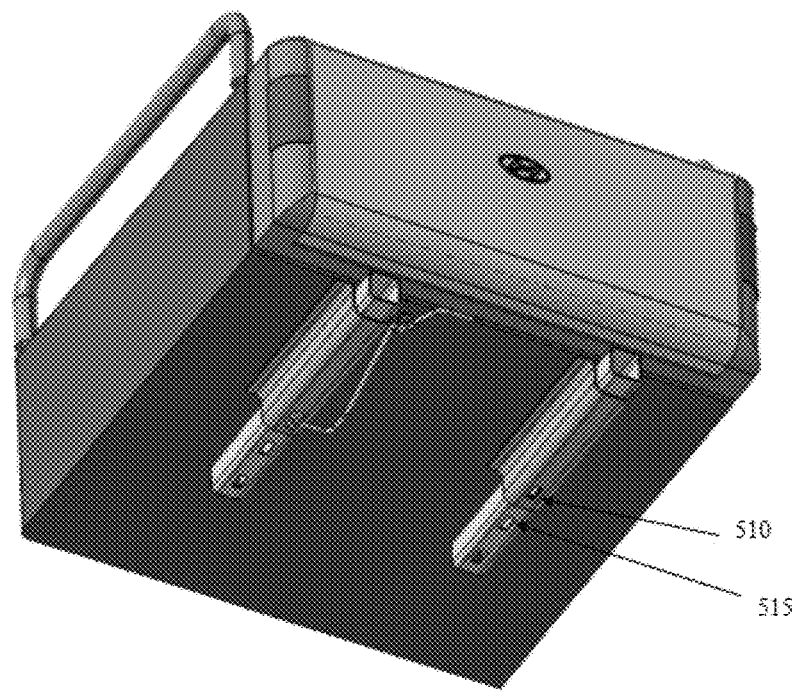
FIGS. 5A-5B are views of the extended bed assembly in a closed position according to an exemplary embodiment of the present disclosure.
Figure 5B:
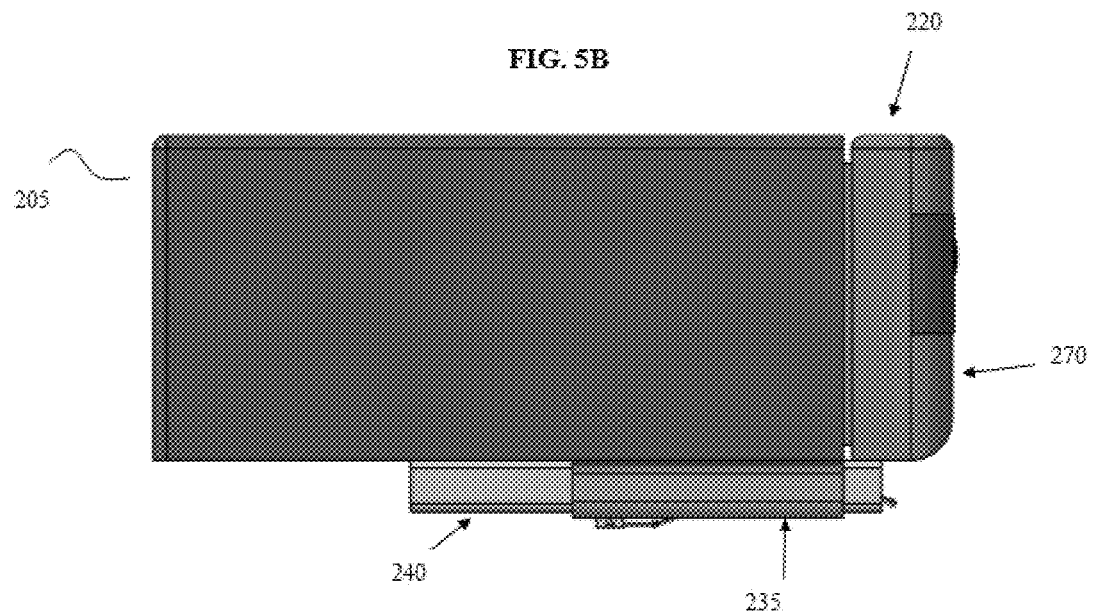

Referring to FIGS. 5A-5B, the bed extension 220 may be fixed in a first position when in nonuse. In other words, when the bed assembly of a truck bed is not extended, the bed extension 220 may be stored within the frame (210, 215) of the bed assembly 205 as previously described. To lock or fix the bed extension 220 in this first position (e.g., a stored position) the protrusion 250 of the release handle 245 may be fitted into a first aperture 510 of the support member 240 aligned with the aperture 305 of the guide 235. The support member 240 may specifically include a first aperture 510, a second aperture 515, and a third aperture 710 to be further described herein below. The apertures may allow the bed extension to be fixed at different positions. For example, the bed extension may be locked at a 6 inch extension and a 12 inch extension, but is not limited thereto and can be fixed at other extended positions.

Figure 6A:
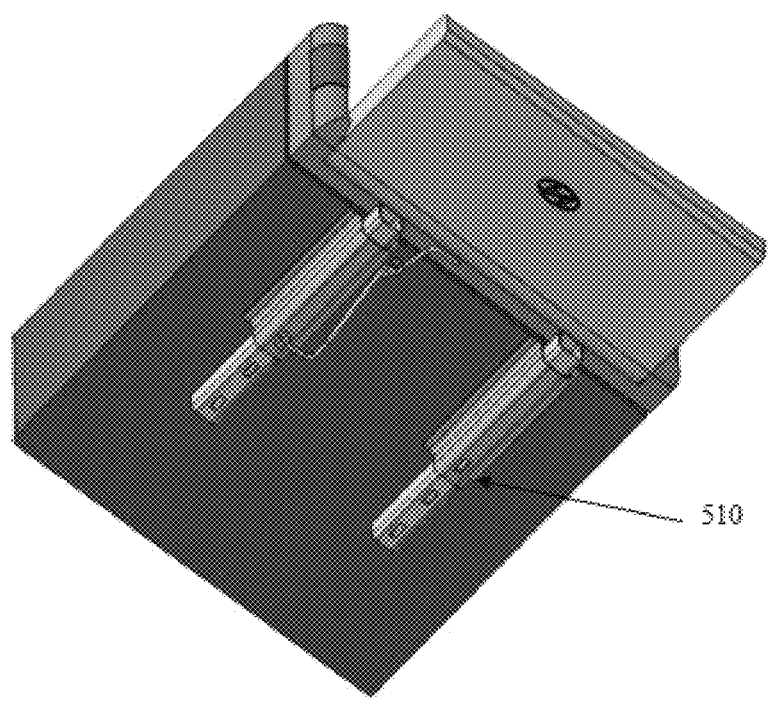
FIGS. 6A-6B are views of the extended bed assembly in a non-extended open position according to an exemplary embodiment of the present disclosure.
Figure 6B:
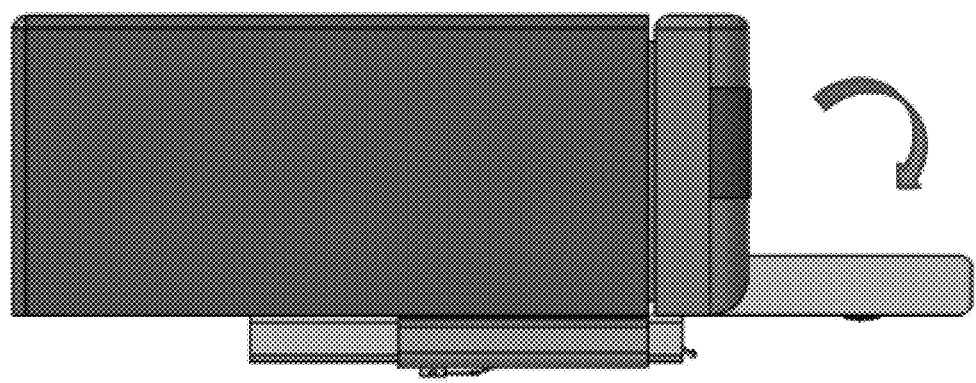

Additionally, in the first position, the side panels 230 of the bed extension 220 may be fitted into the frame (210, 215) of the bed assembly 205 and the flanges 225 of the bed extension 220 may be pushed against the end of the bed assembly. FIGS. 6A-6B illustrate the use of the gate 270 when the bed extension 220 is in the first position. Particularly, the gate 270 may be moved from an upright position to horizontal position for a user to access the storage area of the truck bed. When the gate 270 is opened, the release handle 245 remains actuated as the protrusion 250 remains locked into the apertures 255, 305. In other words, the bed extension 220 remains in a stored position (e.g., the first position 505) while the gate 270 is used.

Figure 7A:
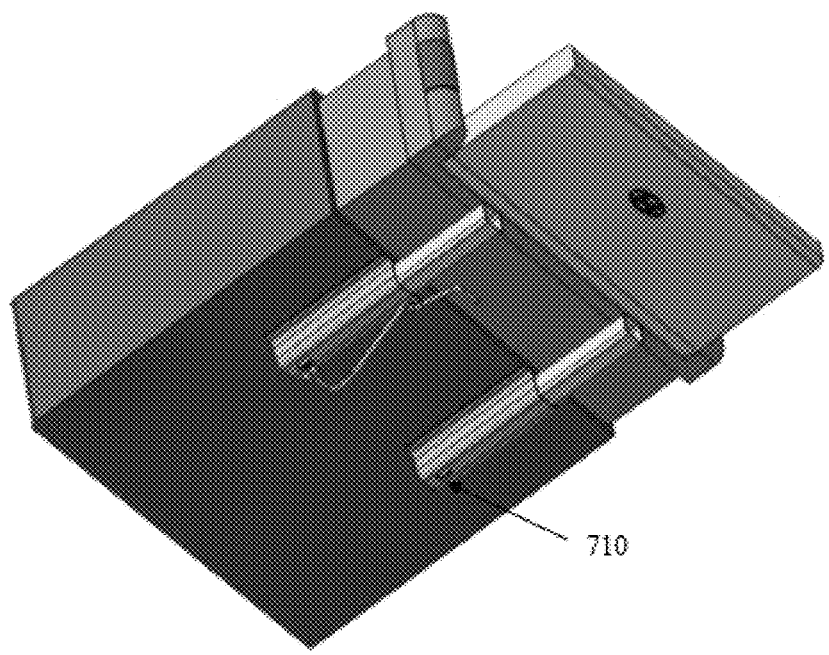
FIGS. 7A-7B are views of the extended bed assembly in an extended open position according to an exemplary embodiment of the present disclosure.
Figure 7B:
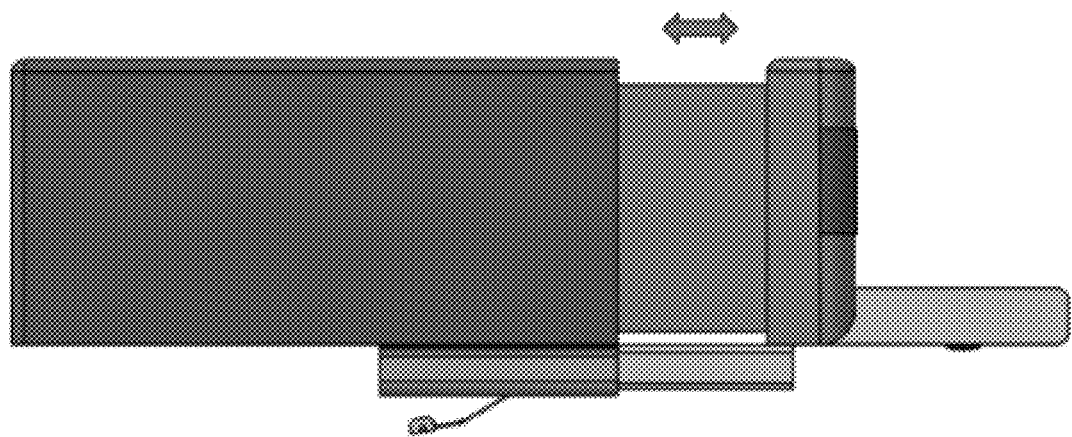

Furthermore, FIGS. 7A-7B illustrate an extended open position of the extended bed assembly 100. In particular, in order to extend the bed extension 220 out from the bed assembly 205, the support member 240 is released from the guide 235 by actuation of the release handle 245. The release handle 245 is actuated by the free end 260 (e.g., actuation portion of handle) of the release handle 245 (e.g., the handle portion of the lever) pushed upwards toward the bed assembly 205. When the release handle 245 is pushed upwards, the protrusion 250 of the release handle 245 is released out of the apertures 255, 305 thus allowing the support member 240 to freely slide out of the guide 235. FIGS. 7A-7B show that when the support member 240 is free to slide within the guide 235, the movement of the support member 240 also causes the bed extension 220 to move in a corresponding linear motion. In other words, once the release handle 245 has been actuated to release the fixed positions of the support member 240 and the bed extension 220, the bed extension 220 may be moved rearward of the bed assembly 205 in a linear motion by manual manipulation. Once the bed extension 220 has reached a desired extended position, the position thereof may be locked by aligning the aperture 305 of the guide 235 with the third aperture 710 of the support member 240. Once the apertures are aligned, the protrusion 250 of the release handle 245 may be fitted into the apertures by the movement of the release handle 245 (e.g., the handle may be pushed downward from the bed assembly). However, until the protrusion 250 is engaged with the apertures 710, 305, the bed extension 220 is free to slide in and out of the bed assembly frame (210, 215).

Figure 8:
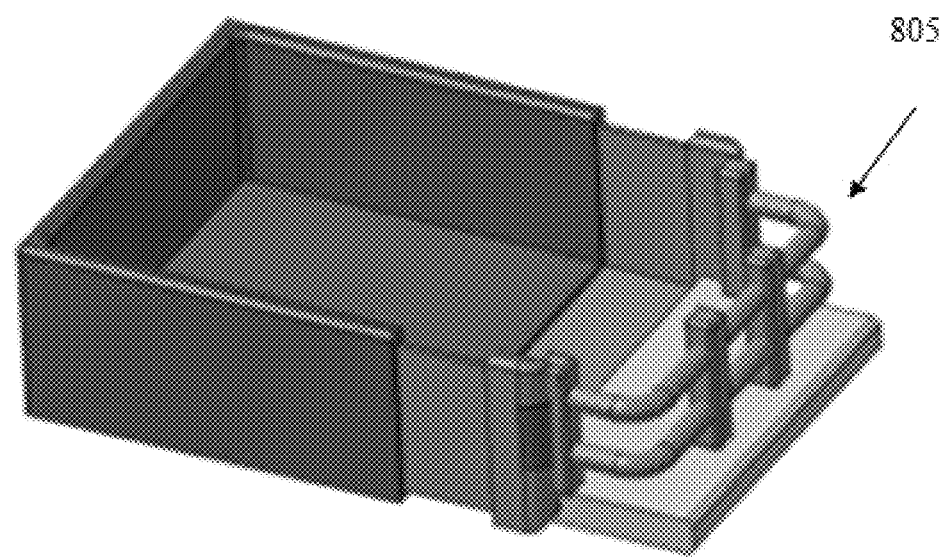
FIG. 8 is a view of the extended bed assembly in an extended open position with a gate according to another exemplary embodiment of the present disclosure.

In another exemplary embodiment, as shown in FIG. 8, when the bed extension 220 is moved to an extended position, the gate 270 may be opened and a fence 805 may be coupled to an end of the bed extension 220 and supported by the open gate 270 to further extend the bed assembly 205. The exemplary embodiment illustratively provides a fence attached to the end of the bed extension 220, however, the present disclosure is not limited thereto. A panel or other fixture may be used to provide an enclosure to further extend the storage space beyond the provided length of the bed extension 220. In other words, the fence 805 may extend the storage space of the vehicle bed to reach the end of the open position of the gate 270.

Figure 9:
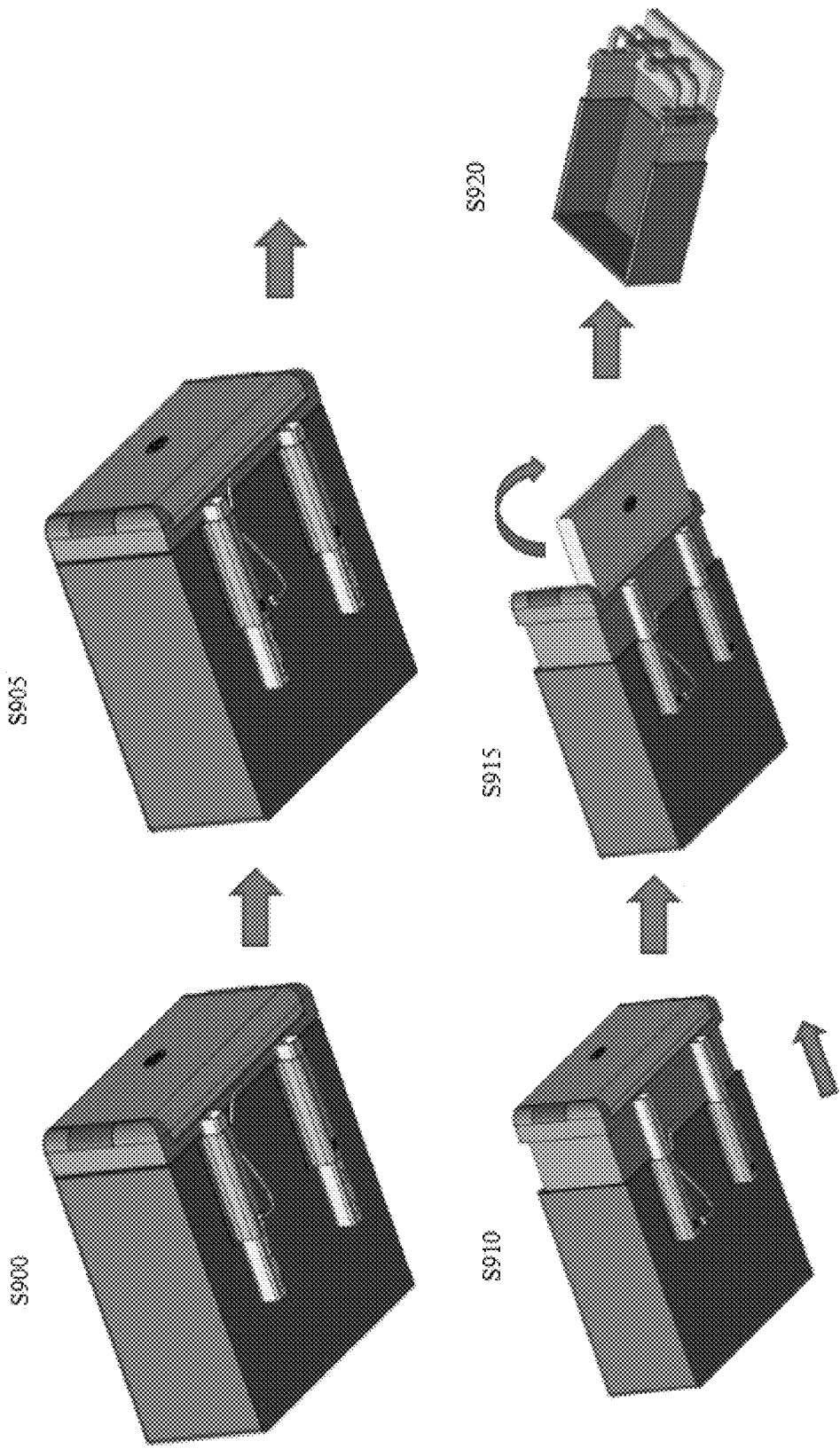
FIG. 9 is a view describing a method of operating an extended bed assembly according to an exemplary embodiment of the present disclosure.

According to another aspect of the present disclosure, a method of operating an integrated extended bed assembly is provided as shown in FIG. 9. The method may include when the extended bed assembly is in a stored position (S900), actuating a lever attached to the bed assembly of the vehicle with one end releasably coupled to sliding members mounted to the bed assembly and a bed extension (S905). Once the lever is released, the bed extension may be linearly slid rearward of the bed assembly (S910). The actuation of the lever specifically releases the lever from the sliding members which move rearward with the linear motion of the bed extension to support the bed extension in an extended position. When the bed extension has been moved to a desired extended position, the lever may again be pushed to thus engage the lever with the sliding members to lock the bed extension position. Particularly, the engagement of the lever with the sliding members includes insertion of a protrusion on the lever into aligned apertures formed in the sliding members. In other words, the insertion of the protrusion fixes the position of the bed extension.

The method may further include opening a gate attached at an end of the bed extension (S915) to allow access to the storage space within the bed assembly. The gate may specifically hinge-coupled to the bed extension to operate between an open position (e.g., horizontal) and a closed position (e.g., upright). In an exemplary embodiment, a fence may be coupled at the end of the bed extension and supported by the opened gate (S920) to further extend the available space of the bed assembly. The present disclosure is not limited to a fence and any other type of enclosure may be used to further extend the bed assembly by being supported by the opened gate.

As discussed above, the integrated extended bed assembly of the present disclosure is capable of providing the following advantages. First, the bed extension is built into or integrated with the bed assembly, thus preventing reduction of vehicle space (e.g., increase design freedom). Second, the bed extension provides additional storage or cargo space for the vehicle beyond the mere length of the bed assembly gate. Third, the bed extension is capable of sliding rearward by manual manipulation upon release of a lever. Fourth, the bed extension is capable of being fixed in at least three different positions. Fifth, manufacturing costs are reduced due to the simplified structural configuration of the extended bed assembly and the manufacturing costs are reduced by eliminating the need to manufacture a variety of bed assembly sizes.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiment. Various modifications and changes may be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. An integrated extended bed assembly for a vehicle, comprising:
    a bed assembly mounted at a rear of the vehicle;
    a bed extension slidably fitted into the bed assembly, wherein the bed extension is extendable rearward of the bed assembly in a linear motion; and
    sliding members mounted to the bed assembly and the bed extension to support the bed extension in an extended position,
    wherein the sliding members include:
        at least one guide secured to a bottom of the bed assembly; and
        at least one support member inserted into the guide and configured to slide rearward beyond the bed assembly to support the bed extension in the extended position,
    wherein a distal end of the support member is coupled to a bottom of the bed extension to move rearward with a sliding movement of the bed extension,
    wherein the support member is fixed in variable positions along the guide to fix the bed extension at one of the variable positions,
    wherein the support member is released from and fixed to the guide by actuation of a release handle, and
    wherein the release handle is spring loaded and the bed extension is fixed at one of the variable positions when a protrusion on the release handle is fitted into one of multiple apertures formed in the support member and aligned with an aperture formed in the guide.

2. The integrated extended bed assembly of claim 1, wherein the release handle is coupled to a bottom of the bed assembly and one end of the release handle is pushed upwards toward the bed assembly to release the protrusion of the release handle from the aligned ones of the apertures.

3. The integrated extended bed assembly of claim 1, wherein the bed extension is slidably fitted between a top and a bottom of a frame of the bed assembly.

4. The integrated extended bed assembly of claim 1, wherein the bed extension is extendable in three variable positions rearward from the bed assembly.

* * * * *